United States Patent
Hall et al.

(10) Patent No.: US 8,584,557 B2
(45) Date of Patent: Nov. 19, 2013

(54) CLAMSHELL LATHE

(75) Inventors: J. Randall Hall, Wadsworth, OH (US); Robert E. Cormany, II, Barberton, OH (US)

(73) Assignee: H&S Tool, Inc., Wadsworth, OH (US)

( * ) Notice: Subject to any disclaimer, the term of this patent is extended or adjusted under 35 U.S.C. 154(b) by 995 days.

(21) Appl. No.: 12/655,264

(22) Filed: Dec. 28, 2009

(65) Prior Publication Data
US 2010/0162860 A1 Jul. 1, 2010

Related U.S. Application Data

(60) Provisional application No. 61/203,964, filed on Dec. 31, 2008.

(51) Int. Cl.
*B23B 5/16* (2006.01)
*B23D 21/04* (2006.01)

(52) U.S. Cl.
USPC ............................................. 82/113; 82/131

(58) Field of Classification Search
USPC .......................... 82/113, 131, 53.1, 128, 130
See application file for complete search history.

(56) References Cited

U.S. PATENT DOCUMENTS

| | | | |
|---|---|---|---|
| 4,236,428 A | 12/1980 | Feamster, III | |
| 4,342,239 A | 8/1982 | Feamster, III | |
| 4,369,679 A | 1/1983 | Jones | |
| 4,397,202 A * | 8/1983 | Mayfield et al. | 82/128 |
| 4,550,635 A | 11/1985 | Kanayama et al. | |
| 4,656,898 A | 4/1987 | Hunt et al. | |
| 4,739,685 A * | 4/1988 | Ricci | 82/113 |
| 4,762,038 A | 8/1988 | Olson | |
| 4,791,842 A | 12/1988 | Olson | |
| 4,823,655 A | 4/1989 | VanderPol | |
| 4,939,964 A * | 7/1990 | Ricci | 82/113 |
| 4,944,205 A | 7/1990 | Ricci | |
| 5,054,342 A | 10/1991 | Swiatowy et al. | |
| 5,549,024 A * | 8/1996 | Ricci | 82/113 |
| 5,685,996 A | 11/1997 | Ricci | |
| 5,881,618 A | 3/1999 | Ricci et al. | |
| 6,257,110 B1 | 7/2001 | Ricci et al. | |
| 6,427,567 B1 | 8/2002 | Ricci et al. | |

(Continued)

FOREIGN PATENT DOCUMENTS

WO WO 2008/052106 A2 5/2008

OTHER PUBLICATIONS

"Portable Pipe Lathe, Operations & Maintenance Manual," Aggressive Equipment, Inc., No date given, Rock Hill, SC 29730, pp. 1-30.

(Continued)

*Primary Examiner* — Will Fridie, Jr.
(74) *Attorney, Agent, or Firm* — Hudak, Shunk & Farine Co. LPA

(57) ABSTRACT

A clamshell lathe that can be utilized to machine or mill a portion of a workpiece such as a tube or pipe, wherein the clamshell lathe is a generally annular device that includes a stationary member and a rotatable member each preferably comprising semi-cylindrical halves that are connected together around the workpiece to be machined. The stationary member includes a bearing channel in which bearings of the rotatable member travel when the rotatable member is activated. In a preferred embodiment, an inner wall of the bearing channel has an angled end portion that is positioned adjacent an angled end portion of the rotatable member.

20 Claims, 3 Drawing Sheets

(56) References Cited

U.S. PATENT DOCUMENTS

| | | |
|---|---|---|
| D466,132 S | 11/2002 | Ricci et al. |
| 6,619,164 B1 | 9/2003 | Ricci et al. |
| 6,799,494 B1 | 10/2004 | Ricci et al. |
| 6,901,828 B2 | 6/2005 | Ricci |
| 7,000,510 B1 | 2/2006 | Place et al. |
| 7,069,829 B2 | 7/2006 | Ricci et al. |
| 7,252,025 B2 | 8/2007 | Place et al. |
| 2010/0162860 A1* | 7/2010 | Hall et al. ............ 82/113 |

OTHER PUBLICATIONS

"*Low Clearance Split Frame User's Manual*," E. H. Wachs Company, Lincolnshire, IL, Revision 7, Aug. 2007, pp. 1-124.

"*Portable Pipe Lathe, Operations & Maintenance Manual*," Aggressive Equipment, Inc., No date given, Rock Hill, SC 29730, pp. 1-30.

\* cited by examiner

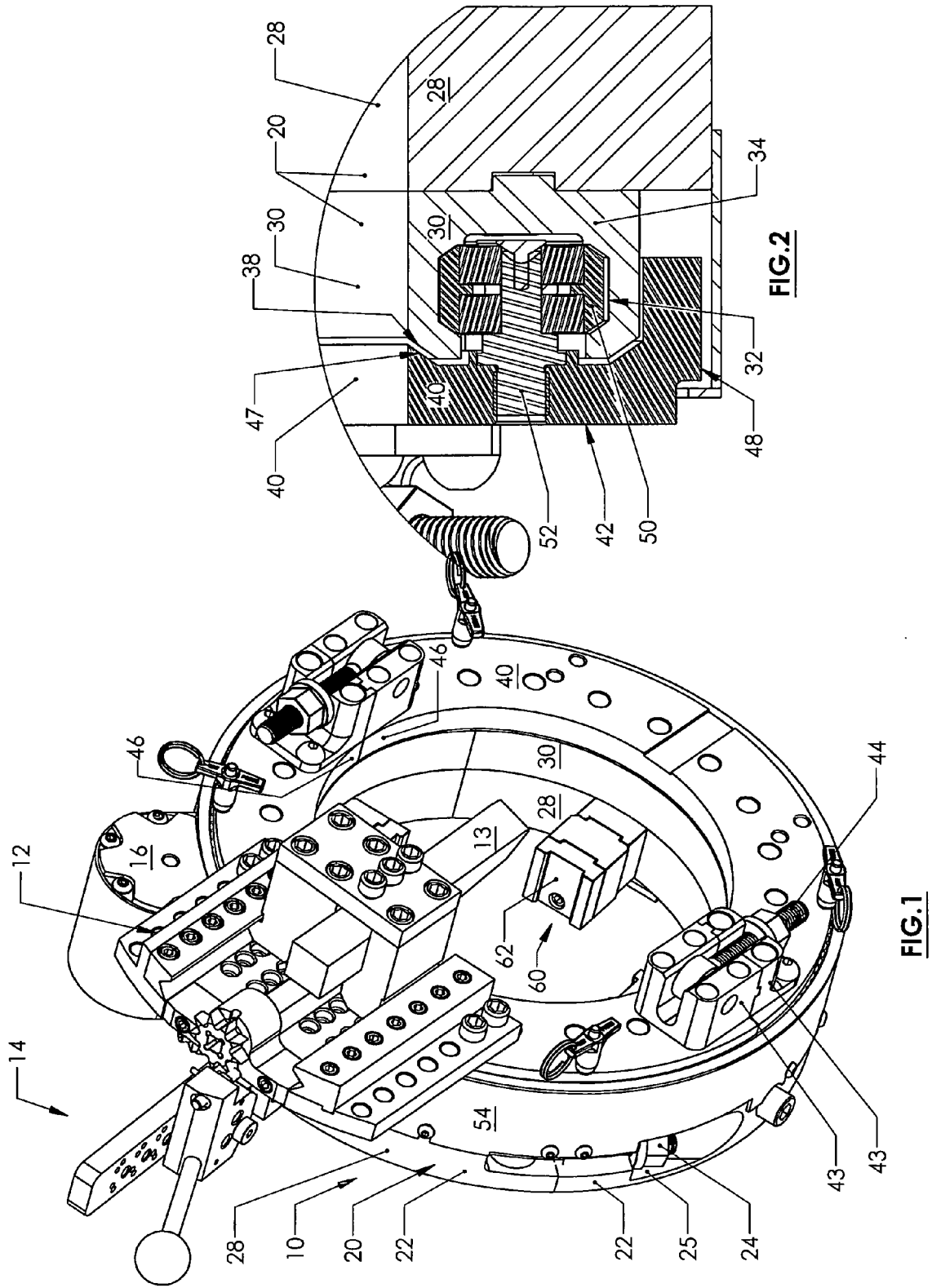

CLAMSHELL LATHE

CROSS REFERENCE

This application claims the priority filing date of U.S. Provisional Application Ser. No. 61/203,964 filed Dec. 31, 2008, herein fully incorporated by reference.

FIELD OF THE INVENTION

The present invention relates to a clamshell lathe that can be utilized to machine or mill a portion of a workpiece such as a tube or pipe, wherein the clamshell lathe is a generally annular device that includes a stationary member and a rotatable member each preferably comprising hollow, semi-cylindrical halves that are connected together around the workpiece to be machined. The stationary member includes a bearing channel in which bearings of the rotatable member travel when the rotatable member is activated. In a preferred embodiment, an inner wall of the bearing channel has an angled end portion that is positioned adjacent an angled end portion of the rotatable member, to aid in preventing debris from entering the bearing channel.

BACKGROUND OF THE INVENTION

Various types of clamshell lathes are known in the art and can be utilized typically in industrial settings to mill a portion of a generally cylindrical pipe or tube. Clamshell lathes in some embodiments are designed as annular devices formed from semi-cylindrical halves connected together around a pipe to be milled. A stationary member of the clamshell lathe is temporarily fixed to the pipe. A rotatable member is operatively connected to the stationary member and is rotatable for example by an air, hydraulic, or electrically-operated motor operatively connected to the rotatable member. In some embodiments, the motor housing is connected to the stationary member and has a drive gear that engages gearing located on the rotatable member. A tool slide can be mounted on the rotatable member and is adapted to hold a milling or cutting tool for milling the pipe. The tool slide can include a feed mechanism that advances the tool slide and thus the cutting tool in a radial direction toward the pipe in incremental steps upon a predetermined revolution of the ring gear.

Examples of clamshell lathes include the following:

U.S. Pat. No. 4,739,685 relates to a lathe having a stationary member and a rotating gear member. A circular race member is connected to the gear member and held in position by means of bearings. Preferably, the bearings have longitudinal axes perpendicular to the top surface of the stationary member. Further, mounting brackets are utilized to reportedly quickly and easily mount a motor onto the stationary member. A two part tool module is also disclosed.

U.S. Pat. No. 4,939,964 relates to a portable machining lathe having a stationary member interconnected with a gear housing which covers a rotating gear member. A circular race member is connected to the gear member and held in place by means of a plurality of roller bearings. A tool module having a tool bit machines the work piece and automatically advances longitudinally along the work piece by means of an advance mechanism.

U.S. Pat. No. 5,549,024 relates to a clamshell machining lathe for cutting and finishing pipes in industrial settings comprising a split-ring assembly, including a clamping ring that is positioned about the pipe, and journaled to the clamping ring is a rotatable gear ring that supports a tool block carrying a cutting tool. The improvement reportedly resides in the bearing arrangement used to journal the gear ring to the stationary clamping ring. One face of the gear ring includes an annular groove whose side walls define a bearing race. The race is dimensioned to receive a plurality of roller bearings therein, the roller bearings being affixed to a planar surface of the clamping gear in a circumferential arrangement so as to fit into the bearing race when the gear ring is coupled to the clamping ring. The arrangement can reportedly support greater loads without canting, thus reportedly reducing wear on the moving parts.

U.S. Pat. No. 6,619,164 relates to a portable machining lathe for machining a pipe or similar workpiece. The lathe includes two semicircular members having a stationary section and a rotatable section. The two semicircular members are cooperatively connected by a hinge system on one end, and steel splice plates on the other. The hinge has a top bracket and bottom bracket on the stationary section of each member, and a male hinge and female hinge on the rotatable section of each member. The male and female hinges are cooperatively connected so that when the hinge is closed the two semicircular members form a complete annulus.

SUMMARY OF THE INVENTION

In view of the above, it would be desirable to provide an improved clamshell lathe, especially having select, wearable components that can be readily replaced without having to replace an entire assembly, such as a stationary member.

A further object of the invention is to provide a clamshell lathe that is relatively easy to assemble and attach to a workpiece such as a pipe or tube so a machining operation can be performed thereon.

Yet another object of the invention is to provide a clamshell lathe with an annular rotatable member that includes a base having a plurality of bearings connected thereto in a generally circular arrangement around the base, wherein an outer sidewall is connected to the base and is spaced from the bearings, and wherein the outer sidewall further includes an outer surface having gear teeth adapted to be engaged by a drive motor fixable to the stationary member that, upon activation, rotates the rotatable member.

Still another object of the invention is to provide a clamshell lathe with a stationary member having a plurality of annular rings, preferably each comprised of semicircular halves, wherein one of the rings includes a bearing channel having two sidewalls that form a track for the roller bearings of the rotatable member.

Yet another object of the invention is to provide the stationary member with a bearing channel in the form of a ring that can be easily replaced without having to replace the entire stationary member which includes a further annular ring comprising a clamping assembly that removably connects the stationary member to the workpiece. The bearing channel can be connected to the clamping assembly ring by fasteners in one embodiment.

Another object of the invention is to provide the clamshell lathe with a mechanism for discouraging milled pieces such as chips, shavings, etc. from entering the bearing channel of the clamshell lathe.

Yet another object of the present invention is to provide the clamshell lathe with a stationary member comprising a bearing channel ring and a clamping ring connected to each other creating an assembly having desirable rigidity.

One aspect of the present invention relates to a clamshell lathe for machining a workpiece, comprising a substantially annular stationary member adapted to be removably connected around an outer diameter of a substantially cylindrical workpiece, the stationary member including a bearing channel having an inner sidewall and an outer sidewall defining a substantially circular bearing track therebetween; and a substantially annular rotatable member having a base and an annular outer sidewall connected to the base and comprising gear teeth located on an outer surface of the outer sidewall, a plurality of bearings rotatably connected to the base of the rotatable member, the roller bearings journaled in the bearing channel of the stationary member so that the rotatable member is operatively connected to and rotatable in relation to the stationary member.

Another aspect of the present invention relates to a clamshell lathe for machining a workpiece, comprising a substantially annular stationary member adapted to be removably connected around an outer diameter of a substantially cylindrical workpiece utilizing a clamping assembly of the stationary member, the stationary member further including a bearing channel having an inner sidewall and an outer sidewall defining a substantially circular bearing track; and a substantially annular rotatable member having a base and an annular outer sidewall connected to and extending outwardly from the base and comprising a gear element located on an outer surface of the outer sidewall, a plurality of bearings rotatably connected to the base of the rotatable member, the roller bearings journaled in the bearing channel of the stationary member so that the rotatable member is operatively connected to and rotatable in relation to the stationary member, wherein the stationary member comprises a bearing channel ring connected to a clamping ring, wherein the bearing channel ring comprises the bearing channel, wherein the clamping ring comprises a fastener for connecting adjacent stationary member sections, and wherein the clamping ring comprises the clamping assembly.

Yet a further aspect of the present invention relates to a clamshell lathe for machining a workpiece, comprising a substantially annular stationary member adapted to be removably connected around an outer diameter of a substantially cylindrical workpiece, the stationary member including a bearing channel having an inner sidewall and an outer sidewall defining a substantially circular bearing track therebetween; and a substantially annular rotatable member having a base and an annular outer sidewall connected to the base and comprising gear elements located on an outer surface of the outer sidewall, a plurality of bearings rotatably connected to the base of the rotatable member, the bearings journaled in the bearing channel of the stationary member so that the rotatable member is operatively connected to and rotatable in relation to the stationary member, wherein the stationary member and rotatable member each have an inner radius, wherein the inner radius of the stationary member includes a portion of an outer surface of the inner sidewall, wherein the outer surface of the inner sidewall includes an angled end section that is not perpendicular to an axis parallel to the inner radius of the stationary member, wherein the rotatable member base has an angled edge connected to an inner radius of the rotatable member, and wherein the angled edge is not perpendicular to the rotatable member inner radius.

BRIEF DESCRIPTION OF THE DRAWINGS

The invention will be better understood and other features and advantages will become apparent by reading the detailed description of the invention, taken together with the drawings, wherein:

FIG. 1 is a perspective view of one embodiment of a clamshell lathe of the present invention;

FIG. 2 is a partial cross-sectional side elevational view of a portion of an embodiment of a clamshell lathe of the present invention including a rotatable member comprising bearings rotatably fixed thereto, wherein a bearing is shown located in a bearing channel of a stationary member, wherein the clamshell lathe comprises a rotatable ring connected to a stationary ring;

DETAILED DESCRIPTION OF THE INVENTION

Figure 3:
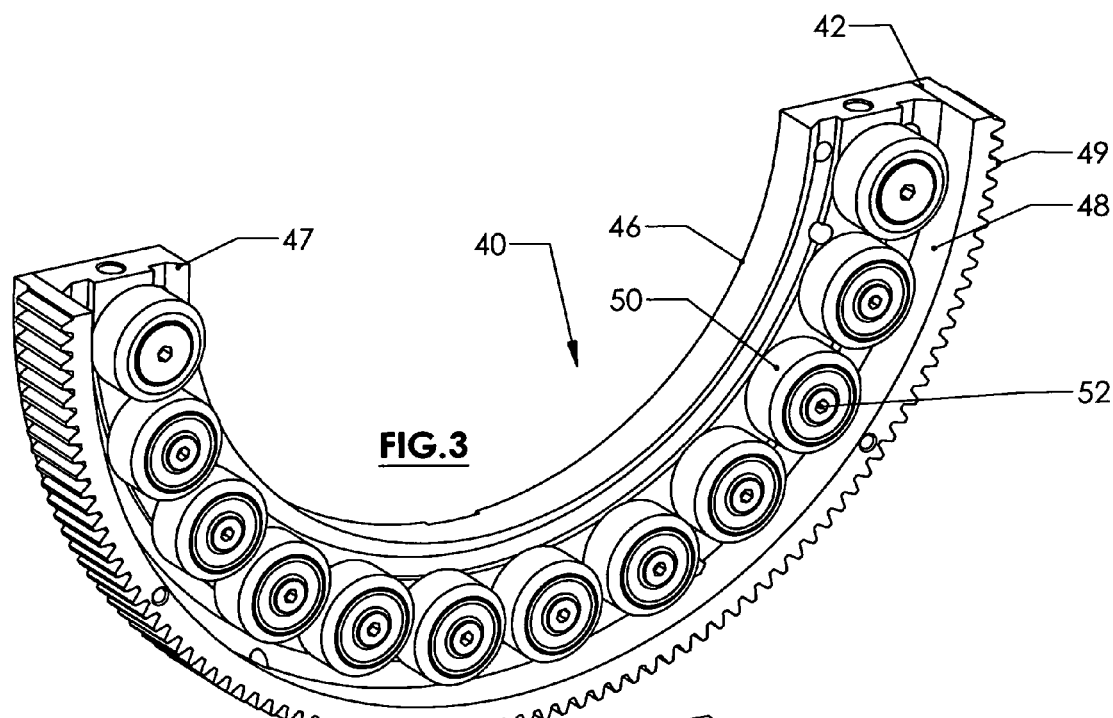
FIG. 3 is a perspective view of a portion of the rotatable member particularly illustrating rotatable bearings arranged in a generally circular pattern and having an axle fixed to a base of the rotatable member, the rotatable member having a single sidewall, namely an outer sidewall extending outwardly from the base and having gear elements on an outer surface thereof.

The invention relates to a clamshell lathe suitable for use in milling a workpiece to which the clamshell lathe is connected, generally in a substantially concentric arrangement, wherein the clamshell lathe is temporarily fixed about the outer diameter or periphery of the workpiece, generally a substantially cylindrical tube or pipe.

The invention will be better understood with reference to the drawings, wherein like numbers represent the same or similar features throughout the numerous figures, wherein FIG. 1 illustrates one embodiment of a clamshell lathe 10. Clamshell lathe 10 comprises a stationary member 20 generally formed in the shape of a ring, and a rotatable member 40 also generally in the shape of a ring operatively connected to the stationary member 20 and rotatable in relation thereto. Each ring may be formed in two or more segments. One or more tool slides 12 are connected to the rotatable member 40, with the tool slide 12 adapted to hold a milling tool 13 for machining the workpiece. Various milling tools are known in the art. In one embodiment, two tool slides 12 are utilized and are generally disposed on opposite sides, i.e. diametrically opposite sides, of the rotatable member 40 which creates a neutral cutting force, whereby binding or twisting of the clamshell lathe can generally be avoided or minimized. A tripper assembly 14 can be provided in preferred embodiments to aid in operatively advancing the milling tool 13 of the tool slide 12 towards the workpiece. Various tool slides and tripper assemblies are known in the art.

The stationary member 20 is formed of at least two sections 22, and preferably two sections 22, such as illustrated in FIG. 1, that are two generally hollow, semi-cylindrical halves, that are connected to form the ring-like or cylinder-like stationary member 20. The sections 22 of stationary member 20 can be connected together by any method. For example, as illustrated in FIG. 1, one of the abutting sections 22 includes a fastener 24, such as a bolt and nut, pivotally connected thereto. The other section 22 includes a recess 25 into which a portion of the fastener is positioned. The nut on the bolt is tightened against a surface of the recess to secure the abutting sections 22. When two-semi-cylindrical stationary member halves are utilized, generally two fasteners and two recesses are utilized to connect the two abutting sections. Obviously, if more than two sections are utilized, more than two fastener and recess combinations are generally utilized.

Figure 4:
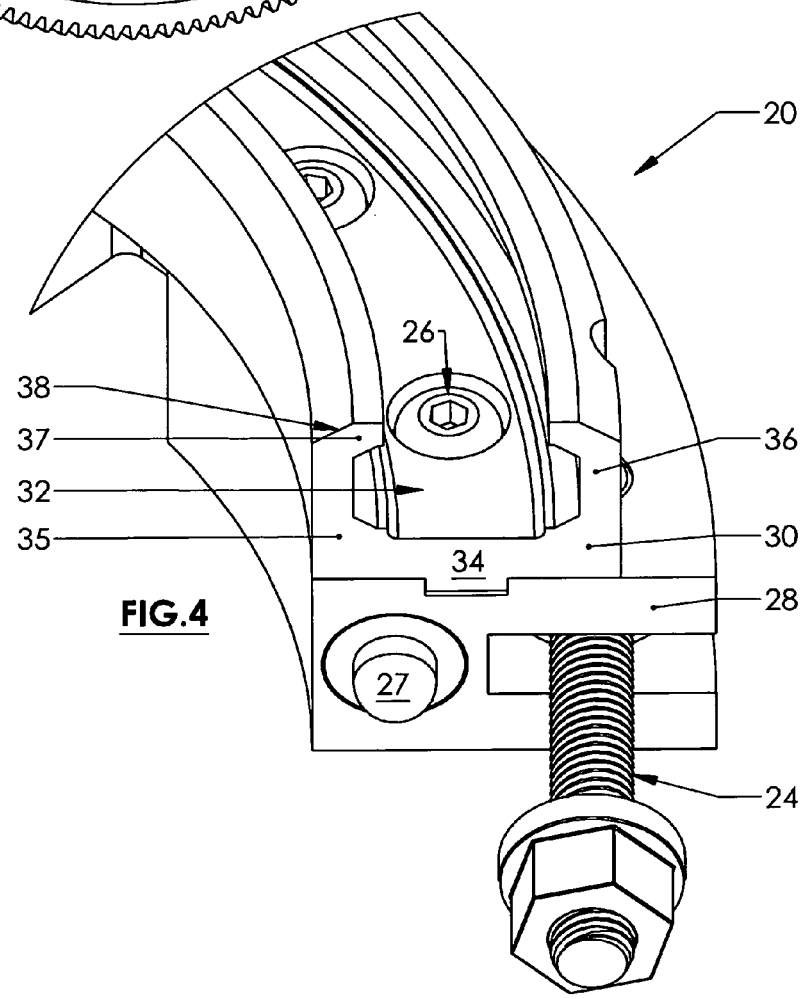
FIG. 4 is a partial side elevational view of a stationary member of the clamshell lathe particularly illustrating the two annular rings thereof, one including a bearing channel and the other including a fastening mechanism for affixing the stationary member of the clamshell lathe to a workpiece.

In a preferred embodiment, the stationary member 20 includes at least two different annular rings or hollow cylinders that are connected together by a suitable fastener 26, such as illustrated in FIG. 4. FIG. 4 illustrates the stationary member 20 including a clamping ring 28 having a bearing channel ring 30 affixed thereto. Each ring has a particular function that aids in providing the clamshell lathe 10 of the present invention with desirable features.

Clamping ring 28 preferably includes components for connecting two or more sections 22 of stationary member 20 together. For example, in the embodiment where clamping ring 28 is formed by two sections 22, each section includes the fastener 24 located at a first end of section 22 and a recess 25 located on the second end of section 22. As illustrated in FIG. 4, one end of the section 22 may include a projection extending outwardly from the end face which fits in the corresponding indentation of another end section 22 that also includes a recess 25 for housing a portion of the fastener 24 when adjacent sections 22 are connected. The projection 27 and indentation aids in aligning the sections 22.

Figure 5:
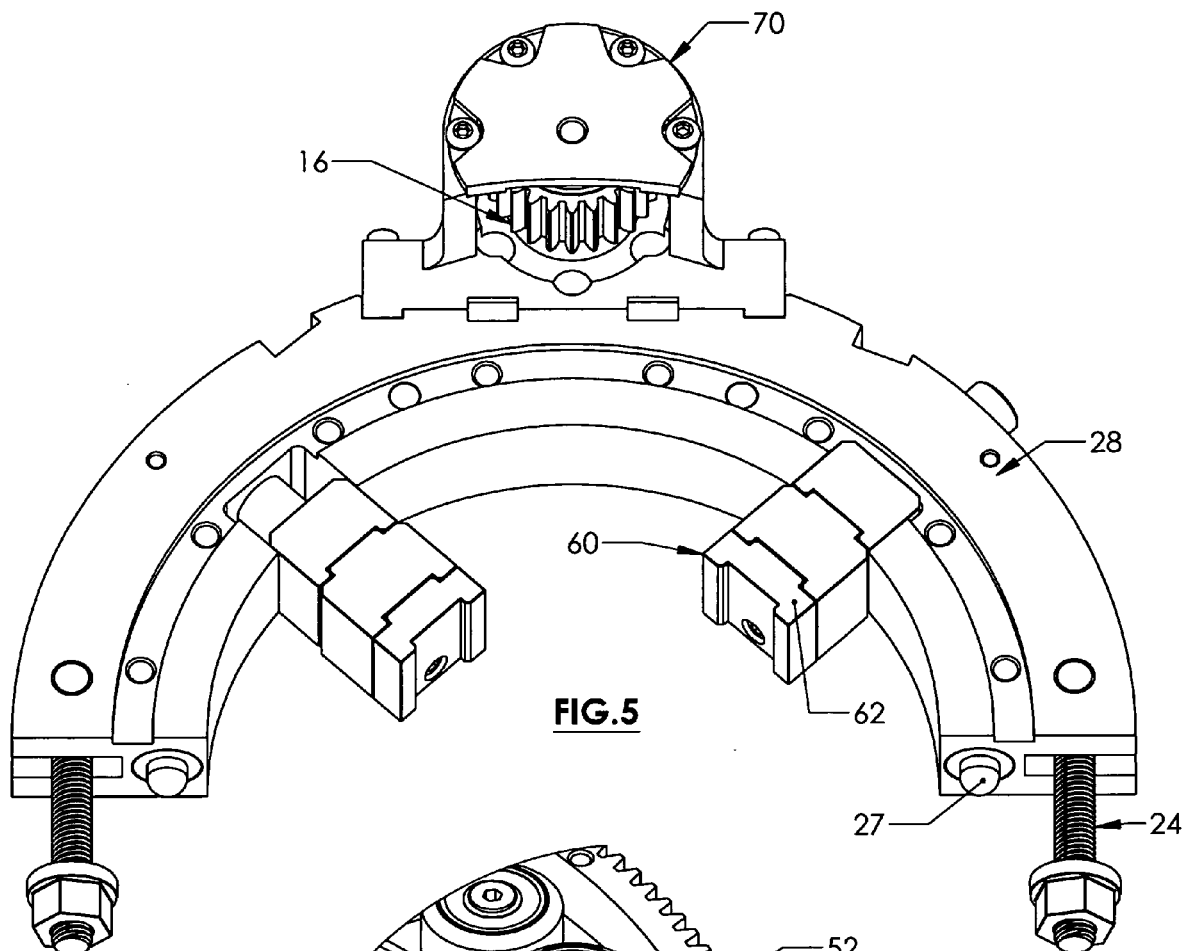
FIG. 5 is a perspective view of one embodiment of a section of a clamping member of a stationary member of the clamshell lathe of the present invention.

Clamping ring 28 also houses clamping mechanism 60, see FIG. 1, that is utilized to position the clamshell lathe 10 in relation to a workpiece. The clamping mechanism 60 preferably includes a plurality of feet 62 that are positioned at one or more locations around the inner diameter of the clamping ring 28 of stationary member 20, wherein each foot 62 is adapted to contact a surface of the workpiece. Clamping mechanism 60 is generally held in place on the clamping ring utilizing fasteners, for example screws such as illustrated in FIG. 5.

In one embodiment, each section 22 is provided with two clamping mechanisms 60, in the case where two semi-cylindrical sections are utilized. In a preferred embodiment, clamping ring 28 is formed of a strong, yet lightweight and durable material, preferably lighter in weight when compared to steel or stainless steel. Aluminum is preferred in one embodiment.

As described hereinabove, the bearing channel ring 30 is connected to clamping ring 28 thereby forming stationary member 20, such as illustrated in FIG. 4. Bearing channel ring 30 includes bearing channel 32 which is designed to accommodate bearings 50 of rotatable member 40. Bearing channel ring 30 includes a base 34 which preferably includes a countersunk bore in which fastener 26 is situated in order to connect the bearing channel 30 to the clamping ring 28, such as illustrated in FIG. 4. Bearing channel ring 30 includes a pair of sidewalls 35, 36 outwardly extending from base 34, generally extending in a direction opposite the clamping ring 28, and each sidewall 35, 36 terminating at an end 37 generally extending inwardly a distance in order to maintain a bearing within bearing channel 32. The inner surface of each of the sidewalls 35 and 36, independently, can include various features, such as angled or chamfered corner edges. The inner surfaces can substantially conform to the shape of a bearing. Angled or chamfered corner edges utilized in some sidewall embodiments can better distribute bearing forces and aid in preventing binding of the rotatable member 40 in relation to the stationary member 20. The width and height of the bearing channel, independently, vary and depend upon the bearings 50 utilized therein and the arrangement of the bearings within the bearing channel. In a preferred embodiment, adjacent bearings are radial offset on the base of the stationary member. Accordingly, the bearing channel width is adjusted accordingly. In a preferred embodiment, the bearing channel ring 30 is formed of a strong, durable metal, preferably steel. Therefore, in one embodiment, the bearing channel ring has a greater hardness (Rockwell) than the hardness of the clamping ring. Bearing channel ring 30 is preferably heat treated prior to machining, which enables the bearing channel ring 30 to resist wear and generally increases the strength thereof.

A further important feature of the present invention is that at least the inner sidewall 35, the sidewall 35 having a smaller radius than the outer sidewall 36, such as illustrated in FIG. 4, includes an angled or chamfered end section 38 that is adapted to abut a corresponding angled or chamfered section 47 on rotatable member 40, as further explained hereinbelow. The angled section 38 is preferably outside of the range of 90°±5° in relation to the cross-sectional longitudinal direction of the sidewall, so that the angled section 38 is generally not situated perpendicular to the direction of the sidewall. The angled end section 38 is angled from about 20° to about 70°, desirably from about 30° to about 60°, and preferably from about 35° to about 55° in relation to the outer diameter wall of sidewall 35 in order to aid in preventing chips or shavings from entering bearing channel 32. Stated in another manner, the generally linearly extending inner sidewall 35 of bearing channel ring 30 has an end 37 that is angled outwardly, generally away from the workpiece or a central axis of the clamshell lathe 10, towards the outer sidewall 36, and end portion 37 is instrumental in preventing foreign matter from entering bearing channel 32. Likewise, the outer sidewall 36 has an angled end section that is angled from about 20° to about 70°, desirably from about 30° to about 60°, and preferably from about 35° to about 55° in relation to the outer diameter wall of sidewall 36. The angled end section of the outer sidewall 36 is generally angled inwardly towards the workpiece or central axis of the clamshell base 10.

Figure 6:
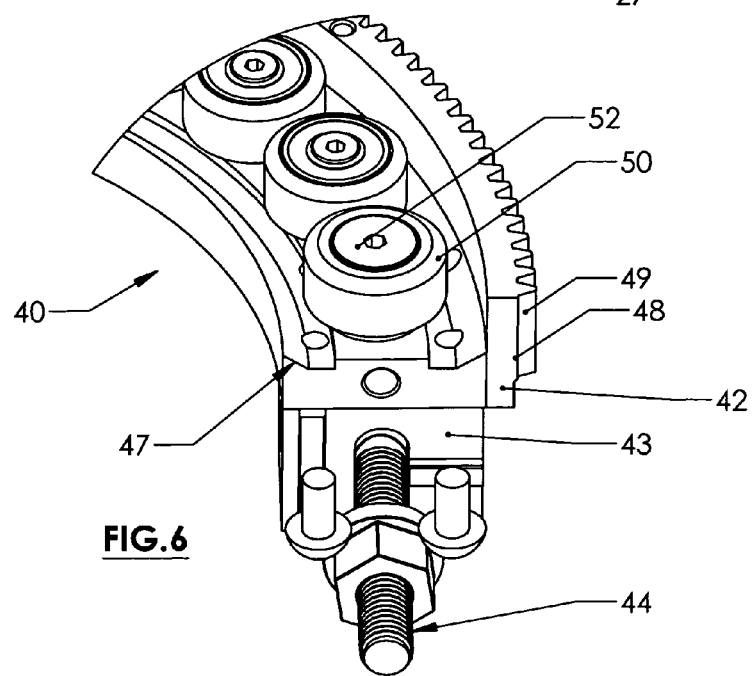
FIG. 6 is a partial side elevational view of a section of the rotatable member of one embodiment of a clamshell lathe of the present invention.

With reference now made to at least FIGS. 3 and 6, the rotatable member 40 will now be further explained. Rotatable member 40 includes a base 42. Rotatable member 40 is formed of at least two sections 46 and preferably two sections 46 such as illustrated in FIG. 1 that are two generally hollow, semi-cylindrical halves, that are connected to form ring-like or cylinder-like rotatable member 40. Rotatable member sections 46 can be connected by any method. A fastening mechanism similar to the mechanism as described hereinabove for stationary member 20 can be utilized. For example, a fastener 44 is connected to a block 43 at one end of a section 46 of rotatable member 40 such as illustrated in FIG. 1. The fastener is then operatively connected to a second adjacent block, in one embodiment utilizing the nut of the fastener as shown, for example. Each block is preferably bolted to base 42. As illustrated in FIG. 1, generally two ring-like rotatable member halves are utilized and two fasteners are utilized to connect two abutting sections. If more than two sections are utilized, more than two fasteners or other securing mechanisms are generally utilized. In a preferred embodiment, base 42 and sidewall 48 of the rotatable member 40 is formed of a strong, durable metal, preferably steel.

In one preferred embodiment of the present invention, the rotatable member 40 includes a single sidewall 48, preferably an outer sidewall 48, extending outwardly from base 42. The sidewall generally forms a ring gear having gear teeth 49 that are preferably formed on the outer peripheral surface of sidewall 48.

A plurality of bearings 50 are operatively connected to base 42 of rotatable member 40, preferably utilizing an axle 52 such as illustrated in at least FIG. 3. While the bearings 50 illustrated are shown having beveled ends, it is to be understood that the bearings have other forms as known in the art.

Suitable bearings are available from The Timken Company of Canton, Ohio. Spacing between adjacent bearings can vary and is preferably about 1.9 mm (0.0625 inch) in one embodiment. The number of bearings utilized is generally dependent upon the size of the bearings and the circumference of the rotatable member in an area at which the bearings are attached.

While it is possible for the bearings 50 to all be located at the same radial distance from a common central axis of the rotatable member, it is preferred that adjacent bearings are radially offset such as shown in FIG. 3. In one embodiment, a first set of bearings 50 is situated on base 42 inwardly from a central radius of base 42 and a second set of bearings 50 is located on an outer radius in relation thereto. Utilizing the offset radius bearing arrangement, the set of bearings having the smaller radius when compared to the central axis generally engage the inner surface of sidewall 35 of stationary member 20 and the bearings having the larger radius when compared to the central axis engage the inner surface of outer sidewall 36 of stationary member 20.

Base 42 has an inner end, i.e. inner radial end, that is provided with an angled surface 47, i.e. not perpendicular to the inner peripheral radial surface of the base 42 that is generally formed complimentary in shape to angled end section 38 of bearing channel ring 30 of the stationary member 20. As illustrated in FIG. 2, surfaces 47 and 38 are adjacent each other, in close relationship, but preferably do not contact each other. The angle between angled surface 47 and inner radius or inner radial wall of base 42 of rotatable member 40 ranges generally from about 20° to about 70°, desirably from about 30° to about 60°, and preferably from about 35° to about 55°.

The clamshell lathe 10 can be assembled and utilized, as follows in a non-limiting manner. Generally, a stationary member section 22 is mated with a rotatable member section 46. For example, rotatable bearings 50 are fed by an operator into bearing channel 32 of stationary member 20, from an end thereof, such that the rotatable member section 46 and the stationary member section 22 are mated, and overlap. At least two sections comprising both the stationary member and rotatable member are connected around a workpiece, for example, the two semi-cylindrical sections illustrated in FIG. 1 comprising two stationary member sections 22 and two rotatable member sections 46. The respective sections 22 and 46 of stationary member 20 and rotatable member 40 are connected. As illustrated in FIG. 1, the stationary member sections 22 are connected utilizing a fastener and recess system as described hereinabove. Likewise, the rotatable member sections 46 are also connected utilizing fastener 44 by connecting the same to a block 43 of an adjacent retainable member section 46. Clamping mechanism 60 is adjusted if necessary in order to provide a desired fit about the workpiece.

A protective cover 54 can be assembled around a portion of the rotatable member to hide sidewall 48 including gear teeth 49. Cover 54 generally contains an aperture wherein a gear from a drive motor 16 that is fixedly connected to the stationary member can be allowed to contact gear teeth 49 in order to drive the rotatable member 40. One or more tool slides 12 are generally connected to the clamshell lathe as indicated hereinabove and rotate around the workpiece upon activation of the rotatable member.

Tripper assembly 14, generally connected to a portion of stationary member 20, contains a tripper element in one embodiment that contacts a portion of the tool slide 12 upon each revolution of the rotatable member thereby causing the milling tool 13 connected to the tool slide 12 to advance towards the workpiece. As known in the art, various suitable gear arrangements exist and the milling tool 13 can be caused to move in various desired directions.

While in accordance with the patent statutes the best mode and preferred embodiment have been set forth, the scope of the invention is not intended to be limited thereto, but only by the scope of the attached claims.

What is claimed is:

1. A clamshell lathe for machining a workpiece, comprising:
    a substantially annular stationary member adapted to be removably connected around an outer diameter of a substantially cylindrical workpiece, the stationary member including a bearing channel having an inner sidewall and an outer sidewall defining a substantially circular bearing track therebetween; and
    a substantially annular rotatable member having a base and an annular outer sidewall connected to the base and comprising gear teeth located on an outer surface of the outer sidewall, a plurality of bearings rotatably connected to the base of the rotatable member, the roller bearings journaled in the bearing channel of the stationary member so that the rotatable member is operatively connected to and rotatable in relation to the stationary member.

2. The clamshell lathe according to claim 1, wherein the stationary member comprises a bearing channel ring connected to a clamping ring, wherein the bearing channel ring comprises the bearing channel, and wherein the clamping ring comprises a fastener for connecting adjacent stationary member sections.

3. The clamshell lathe according to claim 2, wherein the clamping ring further includes at least one clamping mechanism having a foot adjustable in relation to the clamping ring and adapted to be connected to the workpiece.

4. The clamshell lathe according to claim 2, wherein the bearing channel inner sidewall has an outer surface that includes an angled end section extending at an angle from about 20° to about 70° in relation to a line extending along an inner radius of the inner sidewall located outside of the bearing channel.

5. The clamshell lathe according to claim 4, wherein the rotatable member base has an angled edge connected to an inner radial wall of the rotatable member, wherein the angled edge has an angle from about 20° to about 70° in relation to the rotatable member inner radial wall.

6. The clamshell lathe according to claim 2, wherein the stationary member comprises two semi-circular halves operatively connected to each other, wherein the rotatable member comprises two semi-circular halves that are operatively connected to each other and when the roller bearings are in contact with the inner sidewall and the outer sidewall of the bearing channel.

7. The clamshell lathe according to claim 2, wherein the stationary member bearing channel ring inner sidewall and outer sidewall each have a projection which extends inwardly at an end portion towards a central region of the bearing channel in order to maintain the bearings within the bearing channel.

8. The clamshell lathe according to claim 2, wherein the plurality of bearings comprises a first set of bearings connected to a base of the rotatable member at a radius from the central axis which is less than the radius of a second set of bearings connected to the base.

9. The clamshell lathe according to claim 2, wherein the bearing channel ring is formed of material having a greater hardness than a material of the clamping ring.

10. The clamshell lathe according to claim 5, wherein the angled edge of the rotatable member base is disposed adjacent to the angled end section of the bearing channel inner side wall.

11. A clamshell lathe for machining a workpiece, comprising:
a substantially annular stationary member adapted to be removably connected around an outer diameter of a substantially cylindrical workpiece utilizing a clamping assembly of the stationary member, the stationary member further including a bearing channel having an inner sidewall and an outer sidewall defining a substantially circular bearing track; and
a substantially annular rotatable member having a base and an annular outer sidewall connected to and extending outwardly from the base and comprising a gear element located on an outer surface of the outer sidewall, a plurality of bearings rotatably connected to the base of the rotatable member, the bearings journaled in the bearing channel of the stationary member so that the rotatable member is operatively connected to and rotatable in relation to the stationary member, wherein the stationary member comprises a bearing channel ring connected to a clamping ring, wherein the bearing channel ring comprises the bearing channel, wherein the clamping ring comprises a fastener for connecting adjacent stationary member sections, and wherein the clamping ring comprises the clamping assembly.

12. The clamshell lathe according to claim 11, wherein the rotatable member is free of an inner sidewall.

13. The clamshell lathe according to claim 11, wherein an inner radius of the rotatable member base has an angled edge connected thereto that has an angle of about 20° to about 70° in relation to an inner radial wall of the rotatable member.

14. The clamshell lathe according to claim 13, wherein the bearing channel inner sidewall has an outer surface that includes an angled end section extending at an angle from about 20° to about 70° in relation to a line extending along the outer surface of the inner sidewall located outside of the bearing channel, and wherein the angled end section of the bearing channel inner sidewall is positioned adjacent the angled edge of the rotatable member base.

15. The clamshell lathe according to claim 14, wherein the clamping mechanism comprises at least one foot adjustable in relation to the clamping ring and adapted to be connected to the workpiece.

16. The clamshell lathe according to claim 11, wherein the plurality of bearings comprises a first set of bearings connected to a base of the rotatable member at a radius from the central axis which is less than the radius of a second set of bearings connected to the rotatable member base.

17. A clamshell lathe for machining a workpiece, comprising:
a substantially annular stationary member adapted to be removably connected around an outer diameter of a substantially cylindrical workpiece, the stationary member including a bearing channel having an inner sidewall and an outer sidewall defining a substantially circular bearing track therebetween; and
a substantially annular rotatable member having a base and an annular outer sidewall connected to the base and comprising gear elements located on an outer surface of the outer sidewall, a plurality of bearings rotatably connected to the base of the rotatable member, the bearings journaled in the bearing channel of the stationary member so that the rotatable member is operatively connected to and rotatable in relation to the stationary member, wherein the stationary member and rotatable member each have an inner radius, wherein the inner radius of the stationary member includes a portion of an outer surface of the inner sidewall, wherein the outer surface of the inner sidewall includes an angled end section that is not perpendicular to an axis parallel to the inner radius of the stationary member, wherein the rotatable member base has an angled edge connected to an inner radius of the rotatable member, and wherein the angled edge is not perpendicular to the rotatable member inner radius.

18. The clamshell lathe according to claim 17, wherein the stationary member comprises a bearing channel ring connected to a clamping, ring, wherein the bearing channel ring comprises the bearing channel, and wherein the clamping ring comprises a fastener for connecting adjacent stationary member sections.

19. The clamshell lathe according to claim 18, wherein the rotatable member base angled edge has an angle of about 20° to about 70° in relation to the rotatable member inner radius.

20. The clamshell lathe according to claim 19, wherein the bearing channel inner sidewall angled end section extends at an angle from about 20° to about 70° in relation to a line extending along an inner radius of the inner sidewall located outside of the bearing channel, and wherein the angled end section of the bearing channel inner sidewall is positioned adjacent the angled edge of the rotatable member base.

* * * * *